April 14, 1970     J. L. MARTIN     3,506,298
TREE SHAKING DEVICE
Filed Feb. 28, 1968
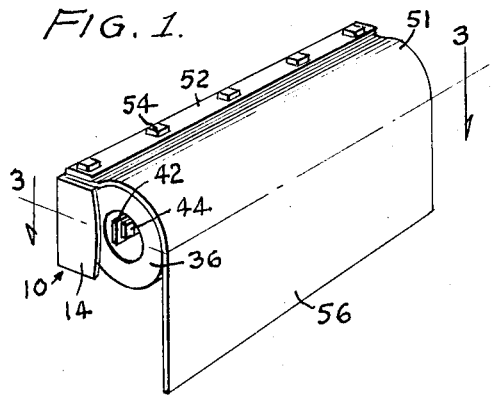
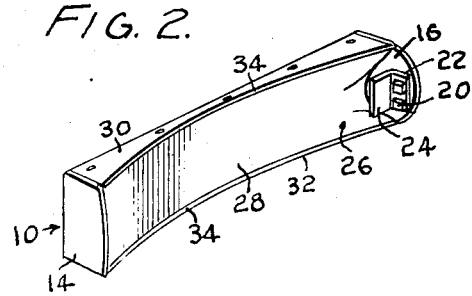
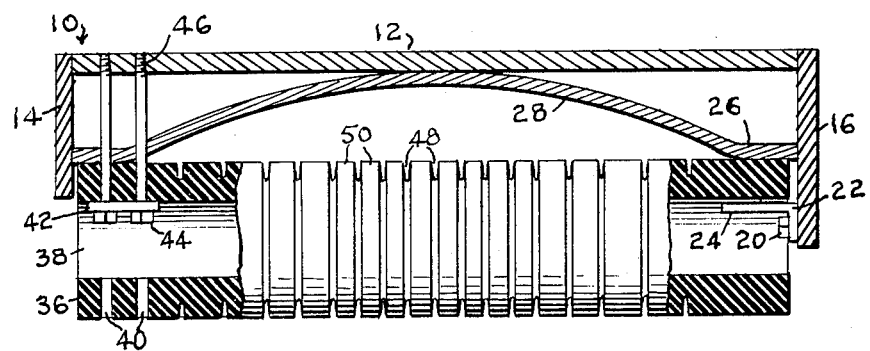
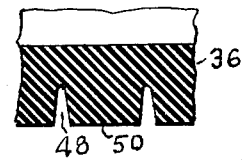
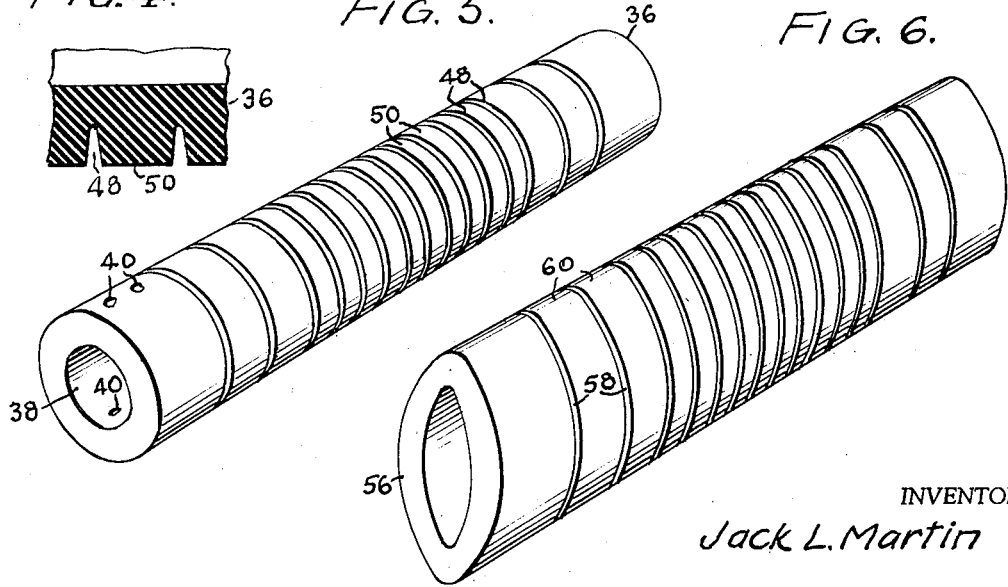
INVENTOR
Jack L. Martin
BY *Alexander B. Blair*
ATTORNEY

United States Patent Office 3,506,298
Patented Apr. 14, 1970

3,506,298
TREE SHAKING DEVICE
Jack L. Martin, 5144 Western Ave.,
Olivehurst, Calif. 95961
Filed Feb. 28, 1968, Ser. No. 708,917
Int. Cl. B25b 11/00; B66c 11/00
U.S. Cl. 294—103                                8 Claims

ABSTRACT OF THE DISCLOSURE

A shaker head, adapted for use with a conventional tree shaking machine used in shaking fruit and nuts from trees, has an elongated resilient shaker element supported solely at its ends by a shaker head, the face of which toward the shaker element is concaved so that when the device is pressed against a tree, its inherent resiliency permits it to be deformed into the concave face of the head for a firm grip against the tree.

CROSS-REFERENCE TO RELATED APPLICATION

The present invention is an improvement over the shaker heads shown in my co-pending application Ser. No. 602,350, filed Dec. 16, 1966. The co-pending application generally indicates a machine having two relatively movable parts, each carrying a shaker head, relative movement of said parts bringing the heads into engagement with opposite sides of a tree so that the operation of the apparatus will shake the tree and dislodge the fruit or nuts therefrom.

BACKGROUND OF THE INVENTION

It has been found to be more economical to shake fruit and nuts from trees than to employ hand labor for picking them. Machines used for this purpose through a back and forth movement transmitted from the shaker heads to the tree, shake the fruit or nuts from the tree to fall therefrom. Machines are now available which not only cause a back and forth movement in one line to shake the tree, but transmit transverse movement to the shaker heads to transmit a different shaking action to the tree. With shaker heads now in use, such back and forth movement tends to strip bark from the trees, and in some instances, ruins the trees. The ruining of a small percentage of trees can be tolerated because of the savings in the cost of labor as compared with hand picking.

SUMMARY OF THE INVENTION

A rigid preferably fabricated steel head is provided with a rear wall adapted for connection with a shaking machine and a forward wall which is concaved substantially from end to end. Against this forward wall is mounted a resilient shaker element fixed to the head solely at its ends so that the intermediate portion of the shaker element is adapted to be deformed toward and into the concavity in the forward wall of the head. This provides for the partial wrapping of the shaking element around the tree and thus minimizes the stripping of the bark therefrom to the point where the ruining of the trees is substantially eliminated. The resilient shaker element is circumferentially grooved therearound to provide annular projections engageable with the tree, the grooves increasing the degree of deformability of the shaker element in engagement with the tree to further increase the effective gripping action of the shaker element against the tree.

The shaker element is provided with an axial opening therethrough which further increases the deformability of the element and assists in making extremely easy the mounting of the element with respect to the head. One end of the head is provided with a fixed inward extension which engages in the opening in the shaker element in assembling the device, the other end of the shaker element then being engaged against the head and bolted or screwed thereto. This provides means for readily mounting and demounting the shaker head for replacement or for the turning of the shaker head to present a new surface for engagement with the tree. An apron is fixed to the top of the head and extends downwardly over the front of the shaker element to prevent debris falling from the tree from lodging behind the shaker element and to present a friction element engageable with the tree to reduce damage to the tree engaging portion of the shaker element.

BRIEF DESCRIPTION OF THE DRAWING

FIGURE 1 is a perspective view of the shaking device;
FIGURE 2 is a similar view of the head, the shaker device and apron being removed;
FIGURE 3 is an enlarged section on lines 3—3 of FIGURE 1;
FIGURE 4 is an enlarged fragmentary sectional view of a portion of the cushion;
FIGURE 5 is a perspective view of the cushion; and
FIGURE 6 is a perspective view of a modified form of cushion.

DESCRIPTION OF THE PREFERRED EMBODIMENTS

Referring particularly to FIGURES 1, 2 and 3, the numeral 10 designates the shaker head as a whole preferably fabricated of steel plates welded together. The head comprises a vertical backplate 12 and end walls 14 and 16. The end wall 16 projects forwardly and has bolted thereto as at 20 a bracket 22 including an inwardly extending arm 24 for a purpose to be described. The head is further provided with a plate forming a forward wall 26, the end portions of which may be parallel to the rear wall 12 and the intermediate portion 28 of which is concaved as shown in FIGURE 3. The head further comprises top and bottom walls 30 and 32 the forward edges of which are concaved as at 34 to correspond to the concavity of the wall 26.

Mounted with respect to the head 10 is a resilient tree engaging element or cushion 36, preferably formed of rubber and having an axial opening 38 extending entirely therethrough. One end of the axial opening receives the plate or arm 24 as clearly shown in FIGURE 3. The end of the cushion 36 opposite the plate 24 is provided with openings 40 extending through diametrically opposite portions of the element 36. A small plate 42 is arranged within the axial opening 38 and bolts 44 extend through these openings and suitable openings 46 in the forward wall 26 and rear wall 12. The latter openings may be threaded and preferably tapered to receive the threaded ends of the bolts 44, or the latter may be provided with nuts threaded on the bolts 44 rearwardly of the wall 42.

The cushion 36 is of circular cross section from end to end and is provided externally with a plurality of circumferential grooves 48 forming therebetween annular ribs 50, the ribs adjacent the central portion of the cushion 36 from end to end being relatively close and those toward the ends of the cushion 36 being relatively wider as shown in FIGURE 3.

The device is provided with an apron 51, the top of which is clamped to the top wall 30 by a plate 52 fixed in position by screws 54. The forward end of the apron hangs straight down beyond the forward portion of the cushion as at 56.

In place of the cushion 36, tree engaging elements of other cross sectional shapes may be used such as the elliptical element 56 in FIGURE 6. This cushion is identical with the cushion 36 except for its cross sectional shape which provides somewhat more of a gripping action against the tree, as further referred to below. The cushion 56 is also provided with surrounding grooves 58 similar in arrangement to the grooves 48, and forming therebetween surrounding ribs 60.

OPERATION

In assembling the device, one end of the tree engaging cushion 36 is slipped over the arm or plate 24, whereupon the other end of the cushion is engaged against the adjacent end of the wall 26 and the bolts 44 inserted through the plate 42. It will be noted that the cushion 36 is supported with respect to the head solely at its ends.

It will be understood that the present device is adapted for use with an conventional type of tree shaking machine, and two of the present devices will be supported by such machine for engagement against opposite sides of the tree. If desired one of the present elements may be employed with one side of the tree and a conventional element against the other side, for example one of the elements shown in my co-pending application referred to above. The relatively movable parts of the machine are operated to bring to two tree shaking units firmly into engagement with the tree. The high degree of resiliency of the cushion 36, when the device is pushed under pressure against the tree, is such that the cushion will be deformed laterally toward the concavity 28, thus causing a substantial portion of the cushion 36 to "wrap" around the tree, thus engaging a substantially greater proportion of the circumference of the tree than is done with conventional elements. The resiliency of the element 36 and its deformability is increased by the use of the annular ribs 50 which, when pressed against the tree, are free to deform horizontally of the element 36, thus making the tree gripping action even more effective. In this connection it will be noted that the annular ribs 50 are relatively narrow at the central portion of the length of the cushion and are more widely spaced towards the ends thereof. This is important since it is desirable that the central portion of the length of the cushion be more readily deformable. The narrow ribs referred to with the grooves therebetween provide for the transverse and longitudinal deformability of the narrow ribs, thus permitting the cushion to wrap around a substantial proportion of the circumference of the tree. The grooves 48 are preferably tapered to decrease in width radially inwardly of the cushion.

The apron 56 may be made of rubber, neoprene, or any other suitable material of a flexible, wear resistant nature. This apron assists in protecting the surface of the cushion 36 from damage by direct engagement with the tree and also prevents debris from falling and lodging behind the cushion 36. In practice, the surfaces of the grooves 48 and the inner surface of the apron are powdered with soapstone to reduce friction and permit free deformability of the tree engaging cushion 36.

After the cushion 36 has been worn to a substantial extent, the bolts 44 may be removed to permit the withdrawing of the cushion 36 and its reversal by turning it 180 degrees, the bolts 44 then being inserted through the openings 40 opposite those previously used. The sets of the bolt openings 40 may be increased in number. For example, they may be arranged 90 degrees apart to provide for four operating positions of the element 36.

It will be apparent that the cushion 36 need not be cylindrical in cross section since other shapes readily may be used, for example the elliptical cross sectional shape shown in FIGURE 5. An advantage of this construction is that two of the cushions may be carried by heads arranged closer together than the heads carrying cushions of circular cross section. Moreover, the wide arc of curvature of opposite sides of the elliptical cushion presents a greater tree-engaging surface when the cushion is deformed.

As stated, the present device is highly effective when used with machines which provide merely a straight back and forth reciprocatory shaking movement, but also may be used to great advantage with later machines which also shake the tree in a transverse direction to dislodge more fruit and nuts from the tree. The great resilient area of contact of the device with the tree in the present case substantially eliminates stripping bark from the tree thus preventing the loss of trees from this cause.

From the foregoing it will now be seen that there is herein provided an improved tree shaking device which accomplishes all of the objects of this invention and others, including many advantages of great practical utility and commercial importance.

As various embodiments may be made of this inventive concept, and as many modifications may be made in the embodiments hereinbefore shown and described, it is to be understood that all matter herein is to be interpreted merely as illustrative, and not in a limiting sense.

I claim:

1. A tree shaking device comprising an elongated head adapted for attachment to a tree shaking machine, an elongated tree shaking cushion arranged forwardly of said head and mounted with respect thereto solely at its ends, the portion of said head toward said tree shaking cushion being offset rearwardly therefrom to allow for the lateral deforming of the tree shaking cushion when pressed against the tree, said tree shaking cushion being provided with an axial opening projecting entirely therethrough, said device having means for mounting it relative to the said head comprising a projection extending loosely into one end of said axial opening, and means including a plate in the other end of said axial opening for securing said cushion to said head.

2. A device according to claim 1 wherein said head comprises a forward plate against which the ends of said tree shaking cushion engage, said forward plate being concave from end to end to offset it from said cushion for the lateral deforming of the latter when under pressure against the tree.

3. A device according to claim 1 wherein said tree shaking cushion is provided with grooves transversely of the length thereof to increase the deformability of the portion of said cushion engaged against a tree.

4. A device according to claim 3 wherein said grooves are relatively closer together in the portion of the cushion centrally of the length thereof than toward the ends of said cushion.

5. A device according to claim 1 wherein said cushion is formed of soft resilient material and is provided with a relatively large axial opening therethrough of greater width than the thickness of said cushion.

6. A device according to claim 5 wherein said cushion is provided with a plurality of spaced grooves forming ribs therebetween to increase the deformability of said cushion, said grooves being tapered to decrease in width radially inwardly of said cushion.

7. A device according to claim 6 wherein said cushion is generally oval in cross-section and is provided with an opening extending longitudinally therethrough, said cushion being provided with longitudinally spaced surrounding grooves to increase the deformability of said cushion.

8. A tree shaking device comprising an elongated head adapted for attachment to a tree shaking machine, an elongated tree shaking cushion arranged forwardly of said head and mounted with respect thereto solely at its ends, the portion of said head toward said tree shaking cushion being offset rearwardly therefrom to allow for the lateral deforming of the tree shaking cushion when pressed against the tree, said head comprising a vertical back wall, a forward wall concaved from end to end substantially throughout its length, and end walls, said cushion having an axial opening from end to end thereof, an arm carried by one end wall and projecting into the adjacent end of said cushion, and detachable means securing the other end of said cushion to said head.

References Cited

UNITED STATES PATENTS 3,084,967 4/1963 Harriett.
3,163,458 12/1964 Brandt.

ANDRES H. NIELSEN, Primary Examiner